(12) United States Patent
Vu

(10) Patent No.: US 7,570,039 B1
(45) Date of Patent: Aug. 4, 2009

(54) APPARATUS AND METHOD FOR CONTROL SUPPLY OUTPUT VOLTAGE TECHNIQUES TO TRACK BATTERY VOLTAGE

(75) Inventor: Luan Vu, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/197,645

(22) Filed: Aug. 4, 2005

(51) Int. Cl.
 G05F 5/00 (2006.01)
 H02J 7/00 (2006.01)
 G05F 1/10 (2006.01)
(52) U.S. Cl. .................. 323/299; 320/128; 327/541
(58) Field of Classification Search ............... 323/299; 320/127, 128; 327/525, 539, 540, 541, 543, 327/547
See application file for complete search history.

(56) References Cited

U.S. PATENT DOCUMENTS

| | | | | |
|---|---|---|---|---|
| 3,546,563 A | * | 12/1970 | Thompson | 322/28 |
| 4,441,070 A | * | 4/1984 | Davies et al. | 323/268 |
| 4,591,778 A | * | 5/1986 | Holland | 320/139 |
| 4,629,970 A | * | 12/1986 | Johansson | 323/285 |
| 4,908,567 A | * | 3/1990 | Welker et al. | 323/299 |
| 5,365,200 A | * | 11/1994 | Honnigford et al. | 330/293 |
| 5,514,947 A | * | 5/1996 | Berg | 323/282 |
| 5,850,139 A | * | 12/1998 | Edwards | 323/280 |
| 6,177,780 B1 | * | 1/2001 | Roy et al. | 320/128 |
| 6,201,375 B1 | * | 3/2001 | Larson et al. | 323/277 |
| 6,278,320 B1 | | 8/2001 | Vu | |
| 6,304,131 B1 | | 10/2001 | Huggins et al. | |
| 6,525,515 B1 | * | 2/2003 | Ngo et al. | 323/277 |
| 6,541,946 B1 | | 4/2003 | Chen et al. | |
| 6,580,258 B2 | * | 6/2003 | Wilcox et al. | 323/282 |
| 6,600,299 B2 | | 7/2003 | Xi | |
| 6,636,019 B2 | * | 10/2003 | Stevens | 320/128 |
| 6,639,390 B2 | * | 10/2003 | Perez et al. | 323/282 |
| 6,703,813 B1 | * | 3/2004 | Vladislav et al. | 323/270 |
| 6,724,176 B1 | | 4/2004 | Wong et al. | |

(Continued)

OTHER PUBLICATIONS

"LM34910 High Voltage (40V, 1.25A) Step Down Switching Regulator," Feb. 2005, pp. 1-11, National Semiconductor Corporation, www.national.com.

(Continued)

Primary Examiner—Akm E Ullah
Assistant Examiner—M'Baye Diao
(74) Attorney, Agent, or Firm—Darby & Darby P.C.; Matthew M. Gaffney

(57) ABSTRACT

A voltage regulation and battery charging system is provided. The system can simultaneously provide a regulated output voltage and charge a battery. The system includes a battery charger circuit, a voltage regulator circuit, and a voltage tracking circuit. A voltage divider is used to provide the voltage regulator circuit with a feedback voltage from the output voltage. Further, the voltage tracking circuit is operable to draw current from the voltage divider such that the regulated output voltage tracks the battery voltage if the battery voltage is above a threshold voltage. The voltage tracking circuit includes an op amp, a current mirror, and a resistor that is coupled between the inverting input of the op amp and the battery. The noninverting input of the op amp receives the threshold voltage. Additionally, the output of the op amp is coupled to the gates of the transistors in the current mirror.

24 Claims, 3 Drawing Sheets

U.S. PATENT DOCUMENTS

| | | | |
|---|---|---|---|
| 6,759,836 | B1 | 7/2004 | Black, Jr. |
| 6,781,347 | B1* | 8/2004 | Smith .......................... 320/122 |
| 6,822,514 | B1 | 11/2004 | Aude |
| 6,850,040 | B2 | 2/2005 | Xiong et al. |
| 6,856,124 | B2 | 2/2005 | Dearn et al. |
| 2004/0212347 | A1* | 10/2004 | Fogg .......................... 320/127 |
| 2004/0251969 | A1* | 12/2004 | Abidin et al. ............... 330/308 |
| 2005/0134220 | A1* | 6/2005 | Brohlin et al. .............. 320/128 |

OTHER PUBLICATIONS

Saint-Pierre, Roland, "A Dynamic Voltage-Compensation Technique for Reducing Charge Time in Lithium-Ion Batteries," 2000, *IEEE*, pp. 179-184, Texas Instruments Inc., Dallas, Texas.

Kao, Mary F., "LP3945/LP3946 Evaluation Kit," Sep. 2004, pp. 1-5, Application Note 1296, National Semiconductor Corporation, www.national.com.

* cited by examiner

APPARATUS AND METHOD FOR CONTROL SUPPLY OUTPUT VOLTAGE TECHNIQUES TO TRACK BATTERY VOLTAGE

FIELD OF THE INVENTION

The invention is related to battery chargers, and in particular, to an apparatus and method for a battery charger and voltage regulator system in which the regulated output voltage tracks the battery voltage.

BACKGROUND OF THE INVENTION

Generally, batteries are used to supply power to portable devices such as personal computers, radios, radiophones, stereo cassette tape players etc. Such batteries are typically available in two different types such as those characterized as rechargeable or non-rechargeable and exhibit different end-of-life voltage characteristics and effective series resistances. Non-rechargeable battery types are those ordinary alkaline batteries that should not be subjected to recharging attempts. Rechargeable battery types include nickel-cadmium (Ni—Cd), nickel-hydrogen (Ni—H), lithium-ion (Li—Ion), and nickel metal-hydride (Ni—MH). Also, a Constant Current—Constant Voltage (CC-CV) charging algorithm is common for most modern rechargeable batteries.

Typically, for a Li-Ion battery, battery charging is performed as follows. The supply voltage VDD is regulated to a fixed voltage such as 5.0V throughout the battery charging. If the battery voltage is below a minimum safe operating voltage (e.g. 3.0V), the charge current is regulated to a constant current corresponding to 0.1 C, which is referred to as "pre-charge mode". C represents battery capacity, typically measured in milliAmpere-hours (mA*hr). So, for a battery with a capacity of 1000 mA*hr, if the battery voltage is below the minimum safe operating voltage (e.g. 3.0V), then the charge current is regulated to 100 mA. Once the battery voltage reaches the minimum safe operating voltage, the charge current is regulated at a constant current corresponding to 1 C (e.g. 1 A, for a 1000 mA*hr battery). The battery charger remains in constant current (CC) mode, regulating the charge current to a constant current, until the battery voltage reaches the maximum safe operating voltage (e.g. 4.2V). At this point, the battery charger enters a constant voltage (CV) mode, where the battery voltage remains at 4.2V until the battery is fully charged.

BRIEF DESCRIPTION OF THE DRAWINGS

Non-limiting and non-exhaustive embodiments of the present invention are described with reference to the following drawings, in which.

DETAILED DESCRIPTION

Figure 1:
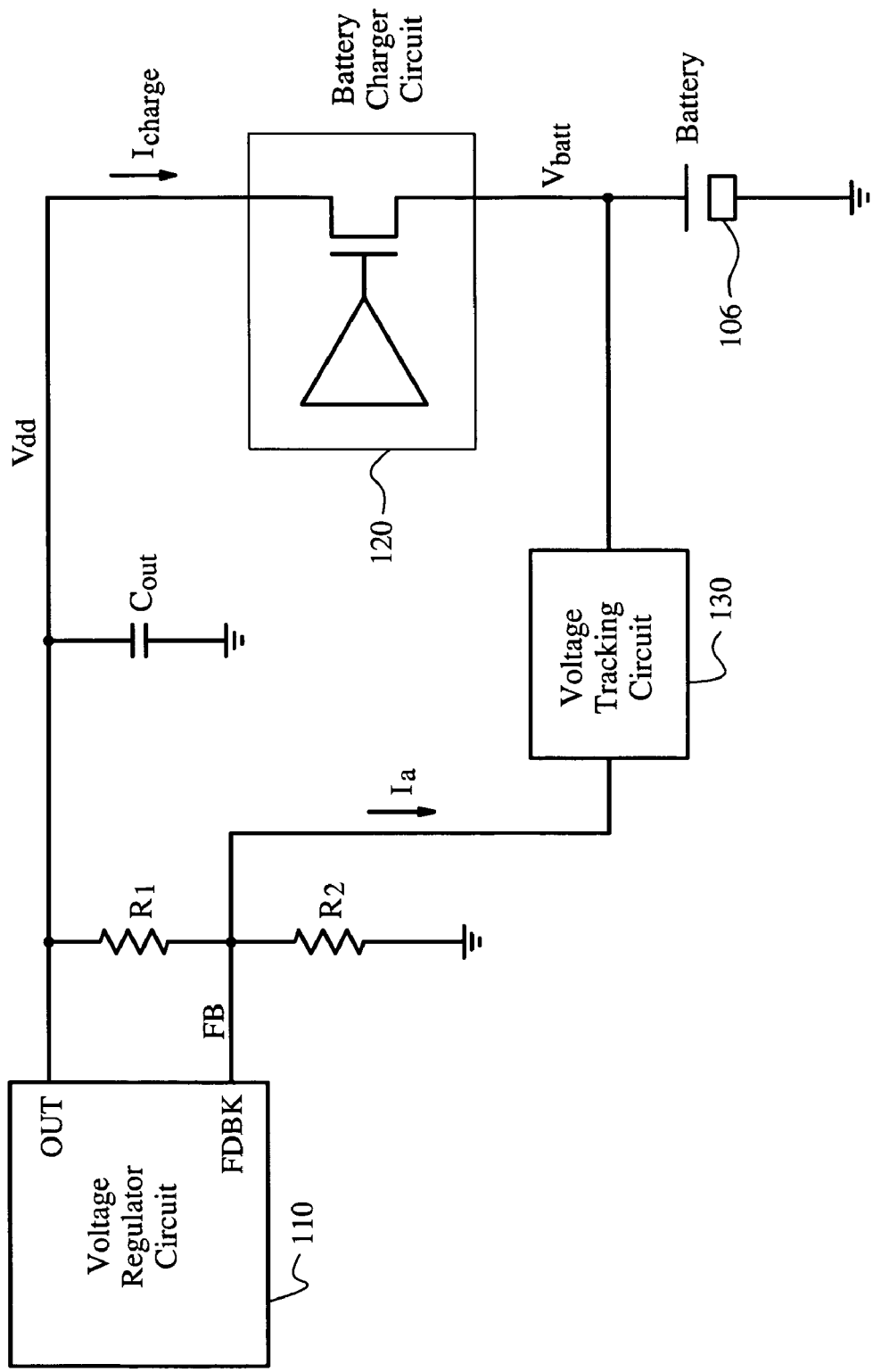
FIG. 1 illustrates a block diagram of an embodiment of a system.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a voltage regulation and battery charging system that can simultaneously provide a regulated output voltage and charge a battery. The system includes a battery charger circuit, a voltage regulator circuit, and a voltage tracking circuit. A voltage divider is used to provide the voltage regulator circuit with a feedback voltage from the output voltage. Further, the voltage tracking circuit is operable to draw current from the voltage divider such that the regulated output voltage tracks the battery voltage if the battery voltage is above a threshold voltage. The voltage tracking circuit includes an op amp, a current mirror, and a resistor that is coupled between the inverting input of the op amp and the battery. The noninverting input of the op amp receives the threshold voltage. Additionally, the output of the op amp is coupled to the gates of the transistors in the current mirror.

FIG. 1 illustrates a block diagram of an embodiment of system 100. System 100 includes battery 106, voltage regulator circuit 110, battery charger circuit 120, voltage tracking circuit 130, resistors R1 and R2, and output capacitor Cout.

In operation, voltage regulator circuit 110 provides regulated output voltage VDD based on an input voltage (not shown) and feedback voltage FB. Voltage regulator circuit 110 may be a low-drop out regulator (LDO), a buck regulator, or the like. Additionally, voltage divider R1/R2 provides feedback voltage FB from voltage VDD. When current Ia is zero, feedback voltage FB may be substantially given by FB=VDD*[R2/(R1+R2)]. Battery 106 is operable to provide battery voltage Vbatt.

Also, battery charger circuit 120 is operable to charge battery 106. In one embodiment, battery charger circuit 120 regulates current Icharge, which is received by battery 106. In one embodiment, battery 106 is a Lithium-Ion (Li-Ion) battery, and battery charger circuit 120 performs a Constant Current-Constant Voltage (CC-CV) charging algorithm.

Voltage tracking circuit 130 is arranged to sink current Ia away from voltage divider R1/R2. Further, voltage tracking circuit 130 is arranged such that current Ia is zero if battery voltage Vbatt is less than a "threshold" voltage; and such that, if voltage Vbatt exceeds the threshold, current Ia is such that voltage VDD tracks voltage Vbatt. ("Threshold" voltage Vs here refers to a voltage which sets the threshold at which voltage tracking is performed, and should not be confused with the threshold voltage $V_T$ at which an inversion layer forms in a MOSFET.) In one embodiment, if voltage Vbatt is greater than voltage Vs, voltage VDD is regulated such that VDD=Vbatt+$\Delta$V. In one embodiment, if voltage Vbatt is less than voltage Vs, then voltage VDD is regulated to Vs+$\Delta$V. In one embodiment, $\Delta$V is 400 mV. In other embodiments, a $\Delta$V other than 400 mV may be employed. In one embodiment, the threshold voltage is 3.0V. In other embodiment, a threshold voltage other than 3.0V may be employed.

Figure 2:
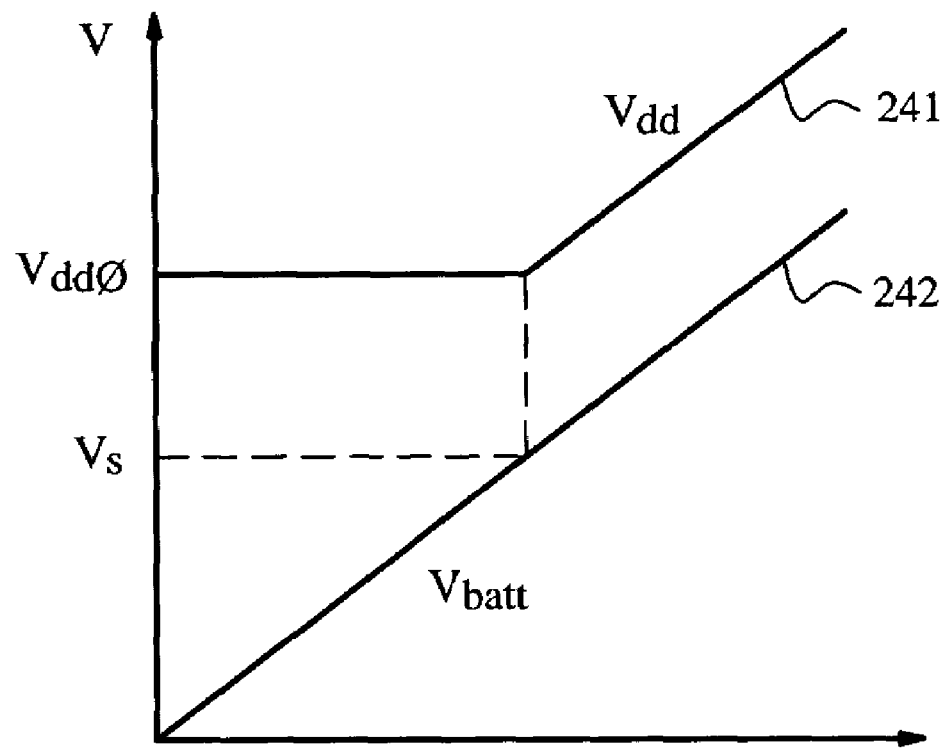
FIG. 2 shows a diagram of waveforms of embodiments of signals from an embodiment of the system of FIG. 1.

FIG. 2 shows a diagram of waveforms of embodiments of signals from an embodiment of system 100 of FIG. 1. Waveform 241 is a waveform of an embodiment of voltage VDD according to one embodiment of system 100, and waveform 242 is a waveform of an embodiment of voltage Vbatt according to one embodiment of system 100.

As shown in FIG. 2, if Vbatt is less than Vs, VDD corresponds to a voltage of VDD$\phi$, which is substantially given by Vref*(1+R1/R2). In one embodiment, Vref, R1, and R2 are selected by the designer so that VDD$\phi$=Vs+$\Delta$V. If Vbatt is greater than Vs, then VDD may be regulated to approximately Vbatt+$\Delta$V. By employing voltage tracking as illustrated in FIG. 2, power dissipation may be reduced by 80% or more.

Figure 3:
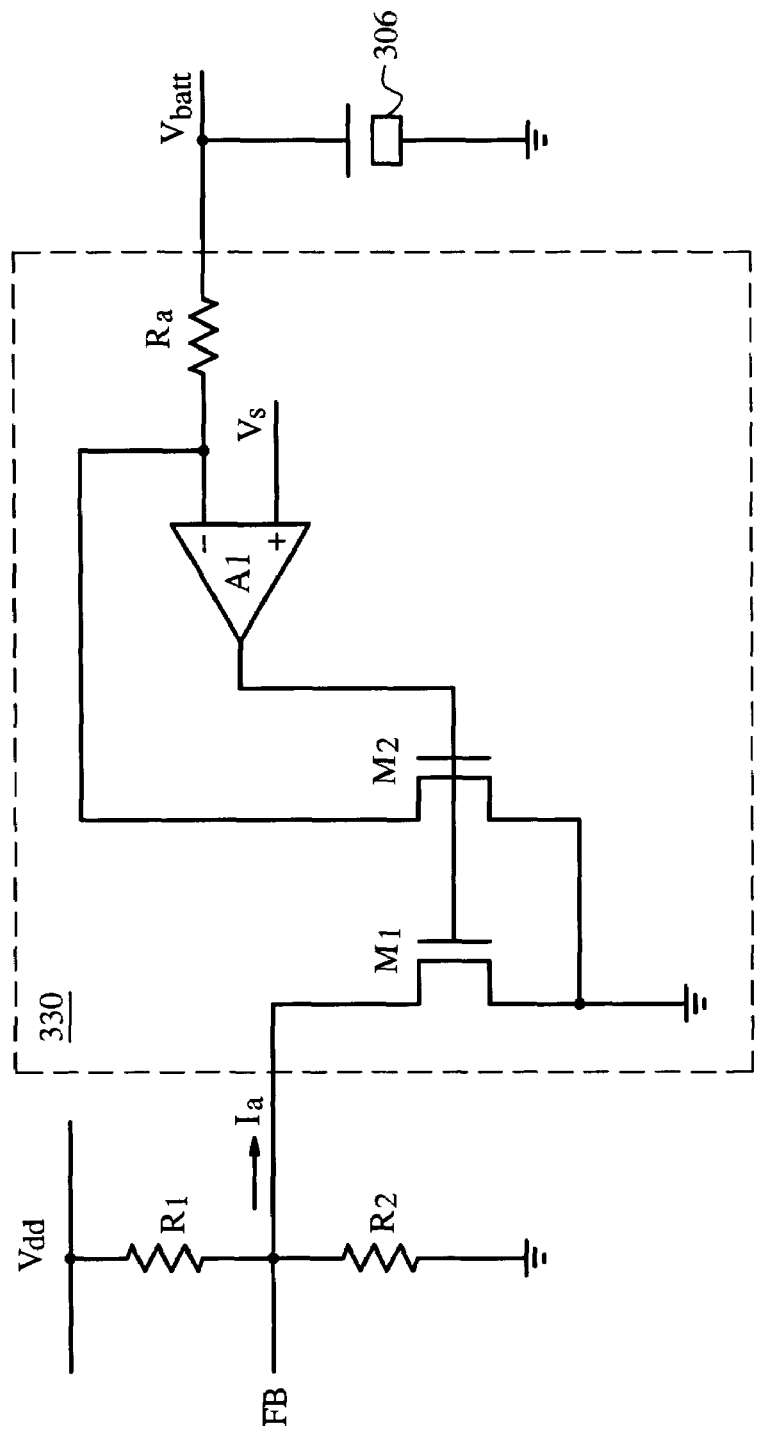
FIG. 3 illustrates a block diagram of an embodiment of the voltage tracking circuit, battery, and voltage divider of FIG. 1, arranged in accordance with aspects of the present invention.

FIG. 3 illustrates a block diagram of embodiments of tracking circuit 330, resistor R1, resistor R2, and battery 306. Tracking circuit 330 may be employed as an embodiment of tracking circuit 130 of FIG. 1. Tracking circuit 330 includes op amp A1, transistor M1, transistor M2, and resistor Ra.

In one embodiment, resistors R1, R2, and R3 are matched to have substantially similar thermal characteristics. In one embodiment, the layout of current mirror M1/M2 is cross-coupled to minimize differences between M1 and M2 due to process variations, thermal gradient, and $V_T$ offset.

If Vbatt is less than or equal to voltage Vs, then Ia is substantially zero and VDD is substantially VDD$\phi$. If Vbatt is greater than Vs, then VDD may be substantially given by VDD$\phi$+R1*Ia. Voltage Vs may be a reference voltage, or the like. For an embodiment in which current mirror M1/M2 is a 1:1 current mirror, current Ia may be substantially given by (Vbatt−Vs)/Ra. Accordingly, VDD may be substantially given by VDD=VDD$\phi$+R1*(Vbatt−Vs)/Ra). For an embodiment in which Ra=R1, VDD may be regulated to approximately VDD=Vbatt+(VDD$\phi$−Vs), where $\Delta$V=(VDD$\phi$−Vs). For example, in an embodiment in which VDD$\phi$ is 3.4V and Vs is 3.0V, if Vbatt is greater than 3.0V, then VDD may be substantially given by VDD=Vbatt+0.4V.

Although one embodiment of tracking circuit 330 is illustrated in FIG. 2, other embodiments are within the scope and spirit of the invention. For example, although transistors M1 and M2 are illustrated as FETs in FIG. 2, in other embodiments, transistors M1 and M2 may instead be bipolar transistors, or the like. Also, although an op amp A1 is illustrated in FIG. 2, in other embodiments, op amp A1 may be replaced with different circuitry that ensures a low offset between voltage Vs and the drain of transistor M2. These variations and others are within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for voltage regulation and battery charging, comprising:
    a voltage regulator circuit, wherein the voltage regulator circuit has at least a feedback input; and wherein the voltage regulator circuit is operable to receive a feedback voltage at the feedback input, and to provide a regulated output voltage based, in part, on the feedback voltage;
    a battery charger circuit that is arranged to charge a battery, wherein the battery charger circuit is coupled to the voltage regulator circuit; and
    a voltage tracking circuit having at least an output that is coupled to the feedback input of the voltage regulator circuit, wherein the voltage tracking circuit is operable to receive an amplifier input voltage, and further operable to: if a battery voltage of the battery exceeds the amplifier input voltage, draw current from the feedback node such that the regulated output voltage tracks the battery voltage; and wherein the voltage tracking circuit includes:
        a current mirror circuit having at least an input and an output, wherein the output of the current mirror circuit is coupled to the feedback input of the voltage regulator circuit, wherein the regulated output voltage is the supply voltage for the battery charging circuit.

2. The circuit of claim 1, wherein the layout of the current mirror circuit is cross-coupled.

3. The circuit of claim 1, further including circuitry that is operable to cause the voltage at the input of the current mirror circuit to be approximately equal to the amplifier input voltage.

4. The circuit of claim 3, wherein the circuitry includes an op amp.

5. The circuit of claim 1, wherein the voltage tracking circuit is operable to draw current such that the regulated output tracks the battery voltage such that, if the battery voltage is greater than the amplifier input voltage, the regulated output voltage is regulated to approximately Vbatt+$\Delta$V, where Vbatt represents the battery voltage, and where $\Delta$V represents the predetermined voltage offset, wherein the fixed pre-determined voltage offset is from 100 mV to 600 mV.

6. The circuit of claim 5, wherein the voltage regulator circuit includes an error amplifier that is operable to provide an error signal based on a difference between the feedback voltage and a reference voltage; the voltage regulator circuit and a voltage divider including a first resistor and a second resistor are operable to regulate the regulated output voltage to substantially Vref*(1+R1/R2), where Vref represents the reference voltage, R1 represents the resistance of the first resistor, and R2 represents the resistance of the second resistor; the values of R1, R2, and Vref are pre-determined values such that Vref*(1+R1/R2) is approximately equal to Vs+$\Delta$V, where Vs represents the amplifier input voltage; the amplifier input voltage is less than 3.5V; and wherein the battery charger circuit is operable to perform a CC-CV charging algorithm to charge a Li-Ion battery.

7. The circuit of claim 1, wherein the voltage tracking circuit further includes:
    an amplifier circuit having at least a first input, a second input, and an output, wherein the first input of the amplifier circuit is coupled to the input of the current mirror circuit, and wherein the amplifier circuit is arranged to receive the amplifier input voltage at the second input of the amplifier circuit.

8. The circuit of claim 7, wherein the amplifier circuit is an op amp, the first input of the amplifier circuit is an inverting input of the op amp, and wherein the second input of the amplifier circuit is a non-inverting input of the op amp.

9. The circuit of claim 7, wherein the current mirror circuit includes a first transistor having at least a gate and a second transistor having at least a gate, the gate of the first transistor is coupled to the gate of the second transistor, the gate of the first transistor is coupled to the output of the amplifier circuit; the drain of the first transistor is the input of the current mirror circuit; and wherein the drain of the second transistor is the output of the current mirror circuit.

10. The circuit of claim 7, wherein the tracking circuit further includes a resistor that is coupled between the first input of the amplifier circuit and the battery voltage.

11. The circuit of claim 7, further comprising a voltage divider including a first resistor and a second resistor, wherein the voltage regulator circuit has at least an input, the voltage regulator circuit is arranged to provide the regulated output voltage at the output of the voltage regulator circuit, the first resistor is coupled between the output of the voltage regulator circuit and the feedback input of the voltage regulator circuit, and wherein the second resistor is coupled to the feedback input of the voltage regulator circuit.

12. The circuit of claim 11, wherein the voltage tracking circuit further includes a third resistor that is coupled between the first input of the amplifier circuit and the battery voltage; and wherein the first, second, and third resistors are matched such that the first, second, and third resistor have substantially similar thermal characteristics.

13. A circuit for a battery charger, comprising:
an amplifier circuit having at least a first input, a second input, and an output;
a voltage divider including a first resistor and a second resistor, wherein the first resistor is coupled between a first node and a second node, and wherein the second resistor is coupled between the second node and a third node;
a third resistor that is coupled to the first input of the amplifier circuit, wherein the first, second, and third resistor are matched to have substantially the same thermal characteristics; and
a current mirror circuit having at least an input and an output, wherein the current mirror circuit includes a first transistor having at least a gate and a second transistor having at least a gate, wherein the gate of the first transistor is coupled to the gate of the second transistor, the gate of the first transistor is coupled to the output of the amplifier circuit; the input of the current mirror circuit is coupled to the first input of the amplifier circuit; and wherein the output of the current mirror circuit is coupled to the second node; and wherein the current mirror circuit is arranged to sink current away from the voltage divider.

14. The circuit of claim 13, wherein the amplifier circuit is an op amp, the first input of the amplifier circuit is an inverting input of the op amp, and wherein the second input of the amplifier circuit is a non-inverting input of the op amp.

15. The circuit of claim 13, wherein the third resistor is coupled between the first input of the amplifier circuit and a battery voltage.

16. The circuit of claim 13, wherein the amplifier circuit is arranged to receive a reference voltage at the second input of the amplifier circuit.

17. The circuit of claim 13, wherein the layout of the current mirror circuit is cross-coupled.

18. The circuit of claim 13, wherein a resistance of the first resistor is substantially equal to a resistance of the third resistor, and wherein the current mirror circuit is approximately a 1:1 current mirror.

19. A method for voltage regulation and battery charging, comprising:
providing a charge current to a battery;
regulating at least one of the charge current or a battery voltage of the battery;
regulating an output voltage based, in part, on a feedback voltage;
employing a voltage divider to provide the feedback voltage from the output voltage, wherein the voltage divider includes a first resistor that is coupled between the output voltage and a feedback node, and a second resistor that is coupled to the feedback node; and wherein the feedback voltage is provided at the feedback node; and
if the battery voltage exceeds an amplifier input voltage:
employing a current mirror circuit to sink current away from the feedback node such that the output voltage tracks the battery voltage.

20. The method of claim 19, wherein
employing the current mirror circuit to sink current away from the feedback node includes:
causing a voltage at the input of the current mirror circuit to be substantially the same as the amplifier input voltage; and
employing a third resistor to provide an input mirror current to the input of the current mirror circuit such that, if the amplifier input voltage is greater than the battery voltage, the input mirror current is substantially given by: (Vbatt−Vs)/Ra, where Vbatt represents the battery voltage, Vs represent the amplifier input voltage, and where Ra represents the resistance of the third resistor.

21. The method of claim 19, wherein regulating at least one of the charge current or the battery voltage of the battery and regulating the output voltage are accomplished such that the output voltage is greater than the battery voltage.

22. The circuit of claim 1, wherein the battery charger circuit includes a pass transistor having at least a source and a drain, wherein the drain of the pass transistor is connected to the battery, and wherein the source of the pass transistor is connected to the regulated output voltage such that the regulated output voltage is the supply voltage for the battery charger circuit.

23. The circuit of claim 1, wherein the voltage regulator circuit and the battery charger circuit are distinct circuits from each other, and wherein the regulated output voltage is the supply voltage of the battery charger circuit such that supply voltage provides the battery charger's power such that the battery charger is not powered if battery charger circuit does not receive the regulated supply voltage.

24. The circuit of claim 13, wherein the amplifier circuit and the current mirror circuit are arranged such that the amplifier circuit drives the gate of the first transistor and the gate of the second transistor.

* * * * *

UNITED STATES PATENT AND TRADEMARK OFFICE
CERTIFICATE OF CORRECTION

| | |
|---|---|
| PATENT NO. | : 7,570,039 B1 |
| APPLICATION NO. | : 11/197645 |
| DATED | : August 4, 2009 |
| INVENTOR(S) | : Luan Vu |

It is certified that error appears in the above-identified patent and that said Letters Patent is hereby corrected as shown below:

In column 4, line 36, in claim 4, delete "predetermined" and insert -- pre-determined --, therefor.

Signed and Sealed this

Fifth Day of January, 2010

David J. Kappos
*Director of the United States Patent and Trademark Office*